United States Patent
Jang et al.

(10) Patent No.: US 9,612,423 B2
(45) Date of Patent: Apr. 4, 2017

(54) CAMERA LENS SYSTEM

(71) Applicants: Issac Jang, Shenzhen (CN); Jay Park, Shenzhen (CN)

(72) Inventors: Issac Jang, Shenzhen (CN); Jay Park, Shenzhen (CN)

(73) Assignee: AAC ACOUSTIC TECHNOLOGIES (SHENZHEN)CO., LTD, Shenzhen (CN)

( * ) Notice: Subject to any disclaimer, the term of this patent is extended or adjusted under 35 U.S.C. 154(b) by 0 days.

(21) Appl. No.: 15/011,484

(22) Filed: Jan. 30, 2016

(65) Prior Publication Data

US 2016/0266354 A1   Sep. 15, 2016

(30) Foreign Application Priority Data

Mar. 11, 2015   (KR) .................. 10-2015-0033972

(51) Int. Cl.
| | |
|---|---|
| G02B 13/18 | (2006.01) |
| G02B 3/02 | (2006.01) |
| G02B 9/60 | (2006.01) |
| G02B 13/00 | (2006.01) |

(52) U.S. Cl.
CPC .......... *G02B 13/0045* (2013.01); *G02B 9/60* (2013.01)

(58) Field of Classification Search
CPC .............................. G02B 9/60; G02B 13/0045
USPC .................................. 359/714, 753, 763, 764
See application file for complete search history.

(56) References Cited

U.S. PATENT DOCUMENTS 7,110,188 B2 *   9/2006   Matsui .................... G02B 9/34
                                                  359/714

\* cited by examiner

*Primary Examiner* — William Choi
(74) *Attorney, Agent, or Firm* — Na Xu; IPro, PLLC

(57) ABSTRACT

A camera lens system is disclosed. The camera lens system includes a first lens group having a first lens which has a positive refractive power; a second lens group having a second lens which has a negative refractive power and a third lens which has a negative refractive power; a third lens group having a fourth lens which has a concave image side surface and a positive refractive power; a fourth lens group including a fifth lens which has a convex image side surface and a positive refractive power; a fifth lens group having a sixth lens which has a concave image side surface and a negative refractive power. An image side surface of the second lens is connected to an object side surface of the third lens.

7 Claims, 3 Drawing Sheets

CAMERA LENS SYSTEM

FIELD OF THE INVENTION

The present invention relates to a camera lens system which can be used in smart phones, digital cameras and other portable terminal devices, monitors and PC camera lens for video recording or image capturing.

DESCRIPTION OF RELATED ART

The smart phones or portable devices in recent years emphasize more on their portability. With the continuous development of the display, the demand on the small size, high resolution camera lens of the smart phones or portable devices, monitor lens, PC camera lens and digital cameras etc. is growing. A camera lens system including 4 lenses is used usually to correct astigmatism for higher performance of the lens system in recent time. In other words, for the lens used in low-pixel camera module, the demand on the image resolution is not high due to larger pixel size, three or less lens groups can be used. For the lens with high resolution demand due to the small pixel size and high demand on the image, 3 to 4 lens groups are used.

However, with the continuous development of technology, the pixel requirement is higher on camera's CCD and CMOS material, therefore, the camera lens system with better image quality and better performance is required.

Therefore, it is necessary to provide a new camera lens system to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

Figure 1:
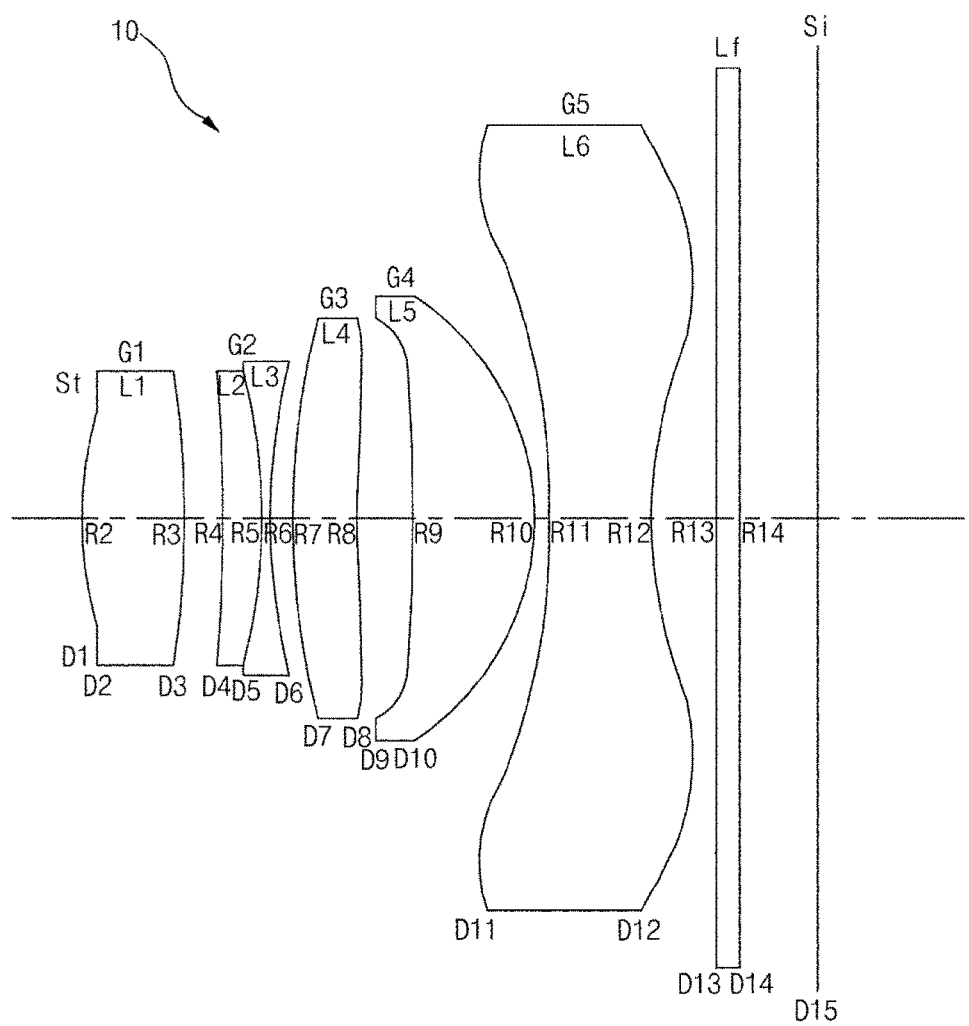
FIG. 1 is an illustration of a camera lens system in accordance with an exemplary embodiment of the present invention.

| Description of the reference numbers in the drawings: | |
|---|---|
| G1: The first lens group | G2: The second lens group |
| G3: The third lens group | G4: The fourth lens group |
| G5: The fifth lens group | |
| L1: The first lens | L2: The second lens |
| L3: The third lens | L4: The fourth lens |
| L5: The fifth lens | L6: The sixth lens |
| R2, R3, . . . : The curvature radius of aperture, lens and optical filter; | |
| D1, D2, . . . : The distance between the aperture, lens and optical filter; | |
| The center thickness of the aperture, lens and optical filter. | |

DETAILED DESCRIPTION OF THE EXEMPLARY EMBODIMENT

The present invention will hereinafter be described in detail with reference to an exemplary embodiment. It should be understood the specific embodiment described hereby is only to explain this disclosure, not intended to limit this disclosure.

Figure 2:
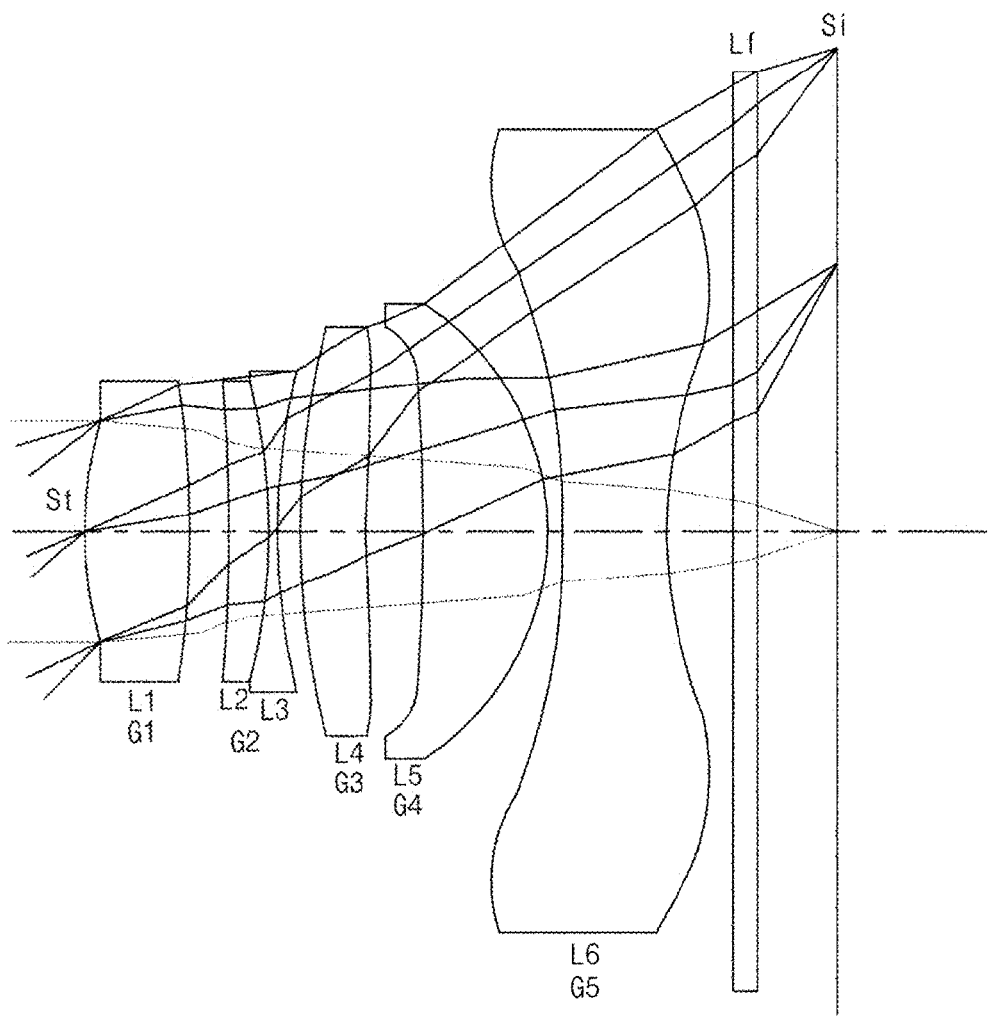
FIG. 2 is the light ray structural diagram of the camera lens system shown in FIG. 1.

Referring to the figures, the present invention provides a camera lens system. The camera lens system 10 shown in FIGS. 1-2 is the first embodiment of the present invention. Referring to FIGS. 1-2, the camera lens system 10 comprises five lens groups lined up from the object side to the image side surface, the aperture St, the first lens group G1, the second lens group G2, the third lens group G3, the fourth lens group G4 and the fifth lens group G5. An optical filter Lf and other optical materials are located between the fifth lens group G5 and the image side surface Si.

The first lens group G1 comprises a first lens L1. The second lens group G2 comprises a second lens L2 and a third lens L3. The third lens group G3 comprises a fourth lens L4. The fourth lens group G4 comprises a fifth lens L5. The fifth lens group G5 comprises a sixth lens L6.

The first lens L1 has a positive refractive power and its object side surface is outwardly convex. In this embodiment, the first lens L1 is a biconvex lens.

The second lens L2 has a negative refractive power and its object side surface is inwardly concave. The image side surface is outwardly convex. The image side surface of the second lens L2 is sphere.

The third lens L3 has a negative refractive power and the third lens L3 is a biconcave lens. The object side surface of the third lens L3 is sphere. The image side surface of the second lens L2 is connected to the object side surface of the third lens L3. Therefore, the contact face between the second lens L2 and the third lens L3 is sphere, i.e., the second lens and the third lens have spherical structure. The spherical structure is easier in producing and processing the lens. The spherical structure can also reduce spherical aberration, astigmatism and distortion aberration.

In particular, the overall performance of the camera lens system is determined greatly by the first lens group G1 and the second lens group G2. This effect will be more obvious for more sensitive lens group.

According to the present invention, the first lens L1 is a biconvex lens. Therefore, the lens is easy to be processed. The second lens L2 has negative refractive power and can reduce the light length. The principal light toward the peripheral area can be gathered and enhanced. In addition, the contact face between the second lens L2 and the third lens L3 is a spherical surface, thereby reducing the difficult degree in precision machining.

The image side surface of the fourth lens L4 is concave and has a positive refractive power. The object side surface of the fourth lens L4 is convex, or, the fourth lens L4 is a biconvex lens. In this embodiment, the curvature radius of the object side surface of the fourth lens L4 is less than the curvature radius of the image side surface of the fourth lens L4.

The image side surface of the fifth lens L5 is outwardly convex and has a positive refractive power. In this embodiment, the object side surface of the fifth lens L5 is concave.

The sixth lens L6 has a negative refractive power. The image side surface of the sixth lens L6 is concave. The object side surface is outwardly convex. In particular, the image side surface of the sixth lens L6 has inflection point. The image side surface of the sixth lens L6 is concave near the optical axis and is convex at the area far away the optical axis. Thus the incident angle of principal light to the image side surface is reduced, thereby reducing spherical aberration and astigmatism, and improving the resolution of the lens.

The object side surface of the sixth lens L6 has also inflection point, i.e. the object side surface of the sixth lens L6 is convex near the optic axis and is concave at the area far away the optical axis.

The aperture St and the object side surface of the first lens L1 are located at the same position, which not only reduces total length of the camera lens system, but also reduces the external diameter of the lens, realizing the minimizing purpose.

In this embodiment, the image side surface of the first lens L1 is outwardly convex. The object side surface of the second lens L2 is inwardly concave. The image side surface of the third lens L3 is inwardly concave. The object side surface of the fourth lens L4 is outwardly convex. The combination of adjacent convex and concave lenses can reduce the entire length of all lenses.

Specifically, f is the effective focal length of all lenses. f12 is the synthetic effective focal length of the first lens group G1 and the second lens group G2, thereby satisfying the following condition (1):

$$1.5 < f12/f < 2.5 \quad (1)$$

The condition (1) above has maximal influence on the astigmatism of the image and minimizes the optical total length. That is, when f12/f is smaller than 1.5, the incident light in all wavelength toward the image side surface is substantially away the focal position, producing astigmatism, as a result, the image quality is reduced. When f23/f is more than 2.5 and the refractive index of the incident light is reduced, the distance from the object side surface to the image side surface of the first lens group G1 becomes longer. It is difficult to gather light.

Further, the first lens satisfies the following condition (2):

$$0.80 < TTL/2y < 0.95 \quad (2)$$

Here, TTL is the distance from the object side surface to the image side surface of the first lens; y is the height of the maximal image, i.e. is half of the length of diagonal line of image surface sensor, so 2y is the length of the diagonal line of the image side sensor.

When TTL/2y is more than 0.95, total optical length increases. The optical system cannot be minimized. In addition, when TTL/2y is smaller than 0.80, the refractive index of the lens will be too large, the optical system is not easy to correct the astigmatism of the second lens group and the third lens group, and therefore cannot get a high-performance camera lens system.

In this embodiment, Vd_L2 represents Abbe number of the second lens and Vd_L3 represents Abbe number of the third lens. In this case, the second lens and the third lens satisfy the following condition (3):

$$0 < |Vd\_L2 - Vd\_L3| < 10 \quad (3)$$

In which, the second lens L2 and the third lens L3 further satisfy the following condition (4) and condition (5):

$$20 < Vd\_L2 < 30 \quad (4)$$

$$20 < Vd\_L3 < 30 \quad (5)$$

The condition (4) and condition (5) above are associated with the refractive index. The refractive index of the second lens L2 and the refractive index of the third lens L3 are similar; therefore, the same material can correct more easily the chromatic aberration.

In particular, it depends on the third lens L3 which has negative refractive power to correct reasonably the chromatic aberration of the second lens L2 which has negative refractive power.

In this embodiment, the first lens L1, the fourth lens L4, the fifth lens L5 and the sixth lens L6 have 50 to 60 Abbe number. In which, the first lens L1, the fourth lens L4, the fifth lens L5 and the sixth lens L6 are made of same plastic material. The second lens L2 and the third lens L3 are made of the same material also.

Under normal circumstances, the difference of Abbe number between the first lens group G1 and the second lens group G2 is from 20 to 40. If the difference is lower than 20, the focal length increases and the field-depth reduces. The distortion and heavy chromatic aberration are large. If the difference is more than 40, the spherical aberration and heavy chromatic aberration become large and total length becomes longer.

R7 is the curvature radius of the object side surface of the fourth lens and R8 is the curvature radius of the image side surface of the fourth lens, thereby satisfying the following condition (6):

$$0.4 < |R7/R8| < 0.7 \quad (6)$$

The condition (6) is related to improve the performance of the camera lens system by correcting the astigmatism of the camera lens system. If |R7/R8| value exceeds the above range, the spherical aberration, astigmatism and image distortion become large. If the astigmatic aberration becomes large, it is difficult to correct the astigmatism and difficult to maintain a high-performance of the camera lens system.

The definition of aspherical surface derived from the example of the present invention is as follows. According to the lens of the present invention, the aspherical surface takes the optical axis direction as z-axis, the direction perpendicular to the optical axis as h axis, and the advancing direction of the light as the positive direction. The following formula 1 is derived thereby. In which, z represents the vertical plane distance from the center optical axis to the aspherical vertex of aspheric coordinate point in the height of R. a1 is the conic constant and C is the reciprocal of the curvature radius of the lens vertex. a4, a6, a8, a10, a12, a14, a16 represent the aspherical coefficients.

$$Z = \frac{CR^2}{(1 + \sqrt{1 - (a1+1)C^2R^2})} + a4r^4 + a6r^6 + \quad \text{[Formula 1]}$$

$$a8r^8 + a10r^{10} + a12r^{12} + a14r^{14} + a16r^{16} \ldots$$

The following illustrates the design data of the camera lens system according to the present invention. Table 1 shows the data of the camera lens system 10 shown in FIG. 1. Table 2 shows the aspherical data. Table 1 shows the curvature radius as R2, R3, . . . shown FIG. 1; The thickness or distance shown in FIG. 1 is D1, D2, . . . . Since the aperture and the object side surface of the first lens are located at the same position, the distance D1 in table 1 between the aperture and the object side surface of the first lens is taken as 0.

TABLE 1

| | Surface properties | Curvature radius | Thickness | nd | vd |
|---|---|---|---|---|---|
| object | Sphere | Infinity | Infinity | | |
| 1 | Sphere | Infinity | 0.00000 | | |
| 2(st) | Asphere | 2.78747 | 0.86602 | 1.5441 | 56.1000 |
| 3 | Asphere | −81.97293 | 0.32467 | | |
| 4 | Asphere | −66.61046 | 0.47950 | 1.6410 | 22.4000 |

TABLE 1-continued

| | Surface properties | Curvature radius | Thickness | nd | vd |
|---|---|---|---|---|---|
| 5 | Sphere | −3.87227 | 0.25000 | 1.6410 | 22.4000 |
| 6 | Asphere | 4.88505 | 0.29060 | | |
| 7 | Asphere | 5.55817 | 0.76092 | 1.5441 | 56.1000 |
| 8 | Asphere | 10.98382 | 0.49796 | | |
| 9 | Asphere | −49.10815 | 1.21837 | 1.5441 | 56.1000 |
| 10 | Asphere | −1.55935 | 0.31009 | | |
| 11 | Asphere | 39.11371 | 0.59642 | 1.5350 | 56.0000 |
| 12 | Asphere | 1.33748 | 0.55544 | | |
| 13 | Sphere | Infinity | 0.21000 | 1.5167 | 64.2000 |
| 14 | Sphere | Infinity | 0.64588 | | |
| image | Sphere | Infinity | −0.00588 | | |

TABLE 2

Aspheric coefficient

| | Conic constant (k) | 4 times factor (A) | 6 times factor (B) | 8 times factor (C) | 10 times factor (D) | 12 times factor (E) | 14 factor (F) |
|---|---|---|---|---|---|---|---|
| 2 | −1.117803E+00 | 4.00146SE−03 | −1.402723E−04 | −1.764499E−03 | 2.963251E−04 | 7.248039E−05 | −1.44840GE−04 |
| 3 | 2.102008E+03 | −5.351726E−03 | −3.853365E−03 | −1.218221E−03 | −2.65107 IE−04 | −2.880549E−05 | 3.564626E−06 |
| 4 | −7.426816E+02 | −5.938931E−03 | −2.068418E−03 | −6.415955E−04 | −2.235720E−04 | 1.435299E−05 | 8.335040E−05 |
| 6 | −1.715173E+00 | −4.629438E−03 | 3.681659E−03 | −2.103685E−04 | −1.779622E−04 | 8.464099E−06 | 2.959265E−05 |
| 7 | −2.863111E+01 | −8.540443E−03 | −9.808756E−04 | 1.617493E−04 | 9.243044E−05 | 3.07862 IE−05 | 4.544670E−06 |
| 8 | −1.058962E+02 | −1.021741E−02 | −1.758277E−03 | −3.197589E−04 | −7.436222E−06 | 2.27270 IE−05 | 1.128986E−05 |
| 9 | 6.111738E+02 | 4.0S4505E−04 | −2.251906E−03 | −5.146122E−04 | −1.380848E−04 | −2.373266E−05 | 1.190677E−06 |
| 10 | −5.106129E+00 | −2.037330E−02 | 5.598915E−03 | −1.454582E−03 | 3.919854E−05 | 2.716271E−06 | −8.318113E−07 |
| 11 | 1.655705E+02 | −3.876131E−02 | 5.129459E−04 | 7.897603E−04 | −1.112923E−04 | 9.4407G4E−06 | −4.011785E−07 |
| 12 | −5.213785E+00 | −2.081525E−02 | 2.527947E−03 | −1.984904E−04 | 4.676922E−06 | 1.262711E−07 | −2.404063E−09 |

Figure 3:
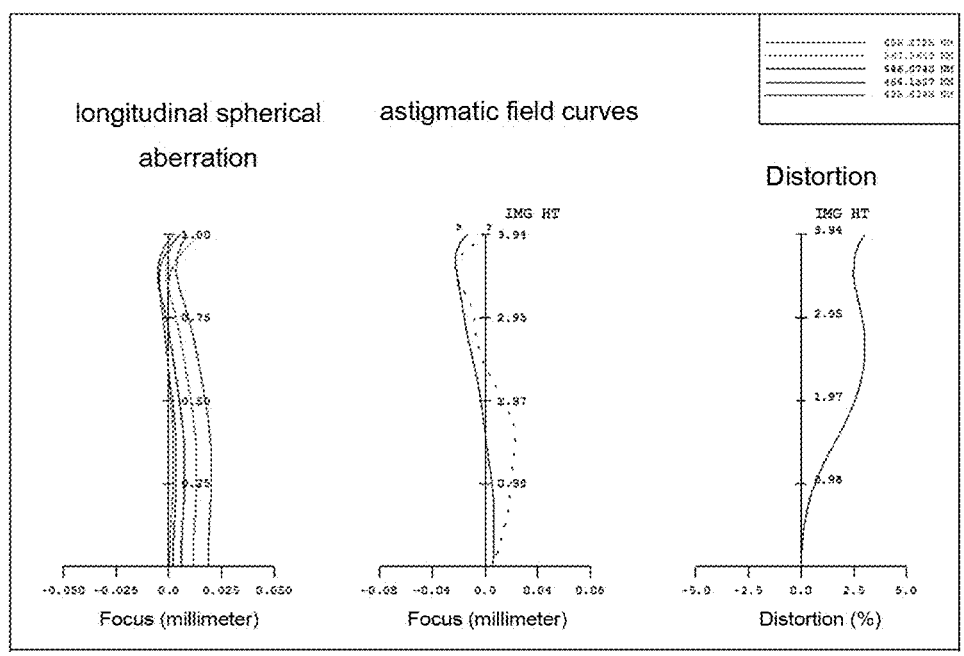
FIG. 3 is the longitudinal spherical aberration, astigmatic field curves and distortion of the camera lens system shown in FIG. 1.

FIG. 3 is the schematic diagram of the longitudinal spherical aberration, astigmatism field curve and distortion of middle and small camera lens system 10 shown in FIG. 1.

The longitudinal spherical aberration diagram shows the light with wavelength of about 65 nm, 587 nm, 486 nm and 435 nm. The astigmatism field curve and distortion indicate the light with the wavelength of 546 nm.

Table 3 below lists the values of all expressions in this embodiment. Obviously, the camera lens system of this embodiment satisfies the expression (1)-(5).

TABLE 3

| Condition | Example 1 |
|---|---|
| $1.5 < f12/f < 2.5$ | 2 |
| $0.80 < TTL/2y < 0.95$ | 0.889 |
| $20 < Vd\_L2 < 30$ | 22.4 |
| $20 < Vd\_L3 < 30$ | 22.4 |
| $0.4 < |R7/R8| < 0.7$ | 0.51 |

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens system comprising five lens groups lined up from the object side to the image side surface, the lens groups including:

a first lens group comprising a first lens which has a positive refractive power;

a second lens group comprising a second lens which has a negative refractive power and a third lens which has a negative refractive power, an image side surface of the second lens being connected to an object side surface of the third lens;

a third lens group comprising a fourth lens which has a concave image side surface and a positive refractive power;

a fourth lens group comprising a fifth lens which has a convex image side surface and a positive refractive power;

a fifth lens group comprising a sixth lens which has a concave image side surface and a negative refractive power.

2. The camera lens system according to claim 1 satisfying the following condition:

$$1.5 < f12/f < 2.5$$

wherein f is the effective focal length of all lenses, f12 is the synthetic effective focal length of the first lens group and the second lens group.

3. The camera lens system according to claim 1 satisfying the following condition:

$$0.80 < TTL/2y < 0.95$$

wherein

TTL is the distance from the object side surface of the first lens to the image side surface of the camera lens system;

y is half of the diagonal line of the image side surface of the camera lens system.

4. The camera lens system according to claim 1, wherein the second lens and the third lens satisfy the following condition:

$$0 < |Vd\_L2 - Vd\_L3| < 10$$

wherein, Vd_L2 is Abbe number of the second lens and Vd_L3 is Abbe number of the third lens.

5. The camera lens system according to claim 4, wherein the second lens and the third lens satisfy the following condition:

$$20 < Vd\_L2 < 30$$

$$20 < Vd\_L3 < 30$$

wherein, Vd_L2 is Abbe number of the second lens and Vd_L3 is Abbe number of the third lens.

6. The camera lens system according to claim 1, wherein the fourth lens satisfies the following condition:

$$0.4<|R7/R8|<0.7$$

wherein, R7 is the curvature radius of the object side surface of the fourth lens and R8 is the curvature radius of the image side surface of the fourth lens.

7. The camera lens system according to claim 1, wherein a contact surface of the second lens and the third lens is spherical.

* * * * *